Patented Sept. 21, 1926.

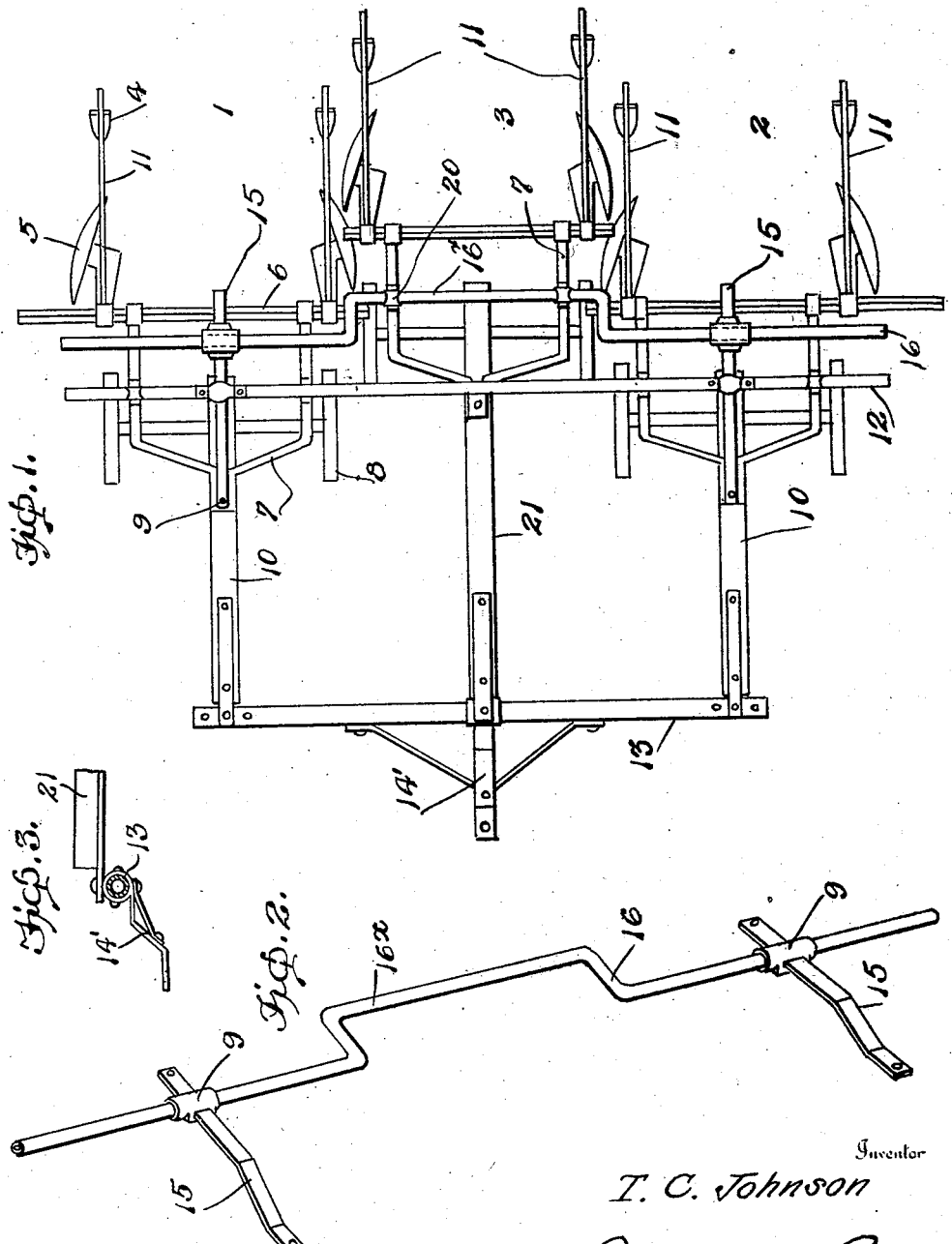

1,600,883

UNITED STATES PATENT OFFICE.

THEODORE C. JOHNSON, OF LEXINGTON, NEBRASKA.

LISTED-CORN-CULTIVATOR-CONVERTING MEANS.

Application filed October 19, 1925. Serial No. 63,405.

The general object of my present invention is the provision of means whereby a two row listed-corn cultivator can be expeditiously and easily converted into a three row cultivator.

Another object of the invention is the provision of means for the purpose described characterized by a member having an angular loop whereby a third gang unit is given the advantage of the useful roller means for keeping the said gang unit in parallelism with the other gang units, the same member also rendering it feasible to place the third gang unit a little behind the other two gang units, thereby affording greater space for the disks and shovels of the several gang units for oscillation side by side without interference with each other, and to permit vertical oscillation of the third or added gang unit independently of the other gang units as when the cultivator is traversing uneven ground.

Another object of the invention is the provision of improved means for hitching the three row cultivator to a tractor or the like.

To the attainment of the foregoing, the invention consists in the improvement as hereinafter described and definitely claimed.

In the accompanying drawings forming part of this specification:—

Figure 1 is a top plan view illustrating my improvement when a two row listed-corn cultivator is converted into a three row listed-corn cultivator.

Figure 2 is a perspective illustrating the loop bearing member constituting an important feature of my invention and the appurtenances of said member.

Figure 3 is a detail view illustrative of a portion of the hitch.

Similar numerals of reference designate corresponding parts in all of the views of the drawing.

In Figure 1 of the drawing, I show the cultivator as comprising three gang units numbered 1, 2 and 3; the outer gang unit being similar to those ordinarily used in a two row listed-corn cultivator, and each having shovels 4 and disks 5 attached to a bar 6, of angular form in cross section, which bar 6 is carried by a bail-shaped frame 7, supported by ground wheels or rollers 8, and connected at 9 to a forwardly reaching frame bar 10. It will also be noticed that each of the units 1 and 2 comprises beams 11 and thus the two units 1 and 2 are connected together through the medium of a transverse bar 12, the said bar 12 being connected to the frames 7 of the two units in the ordinary well known manner or in any other manner compatible with the purpose of my invention. The frame bars 10 are connected to a transverse bar 13, and carried by the said bar 13 is a heavy strap iron 14', disposed as best shown in Figure 3, so as to lower the hitch as is desirable.

By reference to Figure 1 it will be observed that rods 15 are carried by and extend from the frame bars 10, and in accordance with my invention the member 16 which constitutes an important factor thereof is mounted on and connected to the rods 15, by preference, in such manner that the member 16 is capable of rocking about its axis. At its middle, the shaft or rod like member 16 is provided with a laterally deflected or angularly disposed loop $16^x$ which also constitutes an important feature of my invention.

The third gang unit numbered 3 is connected at 20, Figure 1 to the loop $16^x$, and it will also be noted that the bail-shaped frame 7 of the gang unit 3 is connected at its forward end or bight portion to a forwardly extending supplemental bar 21, which latter is detachably connected at its forward end in an appropriate manner to the before mentioned cross bar 13. From this and the remainder of the improved construction as described, it follows that when desirable the three row cultivator may be expeditiously and easily changed back into a two row cultivator.

Manifestly the member 16 positions the central gang unit 3 in such manner that said gang unit 3 operates slightly to the rear of the other gang units 1 and 2, with the result that more space is afforded for the disks and shovels of the several gang units to oscillate laterally without interference with each other; also, with the connection of the gang unit 3 to the member 16, the unit 3 is under the influence of the useful roller means for maintaining the unit 3 in parallelism with the other units 1 and 2. Moreover, on uneven ground and incident to the traverse of the cultivator, the central gang unit 3 is enabled by virtue of its described connection to the members 15 to oscillate vertically with the result that the efficiency of the ground engaging elements of the unit 3 is materially increased.

It will be further apparent from the foregoing that the construction described constitutes a hitch for use in conjunction with the tractor, and one that is rigid for some stretches and flexible for others and at the same time while light in weight is well adapted to withstand the usage in which such constructions are ordinarily subjected.

I have entered into a detailed description of the construction and relative arrangement of the parts embraced in the present and preferred embodiment of my invention, in order to impart a full, clear and exact understanding of said embodiment. I do not desire, however, to be understood as confining myself to the specific construction and relative arrangement of parts as shown and described inasmuch as in the future practice of my invention such changes or modifications may be made as clearly fall within the scope of my appended claims.

Having described my invention, what I claim and desire to secure by Letters-Patent, is:—

1. A cultivator comprising a hitch frame having a forward cross bar and side bars and also having a longitudinal bar disposed intermediate of the side bars and spaced therefrom, gang units connected with the side bars of said frame and equipped with ground working means and also equipped with ground wheels, a transverse member connected with the said gang units and having a central laterally deflected portion or loop, and a central gang unit equipped with ground working means and connected with the lateral loop of the transverse member and also connected with the longitudinal central bar of said frame.

2. A cultivator attachment comprising a frame, a transverse member having an intermediate laterally deflected loop, means on said member at opposite sides of said loop for the connection of the member to spaced gang units, and a gang unit having a bail-shaped frame connected to said frame and to said laterally deflected loop of said member, a bar carried in the arms of said bail-shaped frame, and ground working means connected to said bar and arranged generally in parallelism.

In testimony whereof I affix my signature.

THEODORE C. JOHNSON.